United States Patent [19]

Haunhorst

[11] Patent Number: 5,339,862
[45] Date of Patent: Aug. 23, 1994

[54] REFRIGERATION SYSTEM SERVICE ADAPTER

[75] Inventor: Gregory A. Haunhorst, Perrysburg, Ohio

[73] Assignee: Aeroquip Corporation, Maumee, Ohio

[21] Appl. No.: 98,839

[22] Filed: Jul. 29, 1993

[51] Int. Cl.$^5$ .................................. F16L 37/28
[52] U.S. Cl. ......................... 137/614.05; 137/614.03; 251/264
[58] Field of Search ............... 137/614.05, 614.03, 137/614.06, 614.04; 251/149.6, 264, 273, 265; 285/354

[56] References Cited

U.S. PATENT DOCUMENTS

| | | | |
|---|---|---|---|
| 104,025 | 6/1870 | Harvey . | |
| 1,484,740 | 2/1924 | Rubino | 251/264 |
| 1,906,313 | 5/1933 | Clifford | 251/264 |
| 2,473,223 | 6/1949 | Scheiwer | 284/18 |
| 2,543,589 | 2/1951 | Newcomb | 284/18 |
| 2,739,612 | 3/1956 | Hansen | 137/614.05 |
| 3,295,584 | 1/1967 | Proctor | 158/75 |
| 3,559,952 | 2/1971 | Skinner | 251/347 |
| 3,615,072 | 10/1971 | Kaucher | 251/265 |
| 3,840,967 | 10/1974 | Olson | 29/213 |
| 4,182,370 | 1/1980 | Karcher | 137/614.04 |
| 4,805,417 | 2/1989 | Weaver et al. | 62/292 |
| 4,892,117 | 1/1990 | Spalink et al. | 137/614.03 |
| 4,921,013 | 5/1990 | Spalink et al. | 137/614.05 |
| 5,080,132 | 1/1992 | Manz et al. | 137/614.04 |
| 5,106,055 | 4/1992 | Phillips | 251/264 |
| 5,139,049 | 8/1992 | Jensen et al. | 137/614.05 |

OTHER PUBLICATIONS

C & D Valve Manufacturing Co. Brochure, 1988–9, pp. 8–9.
Mastercool brochure, p. 5.
Robinair print showing various manufacturers couplings.

Primary Examiner—Martin P. Schwadron
Assistant Examiner—Kevin L. Lee
Attorney, Agent, or Firm—Emch, Schaffer, Schaub & Porcello Co.

[57] ABSTRACT

A manually adjustable service adapter includes a manually adjustable actuation shaft for opening the valve of a charging port of a refrigeration system to permit the charging of refrigerant into such system. Actuation of such charging port results from an axially movable shaft which is manually adjustable by a rotatable knob which causes the shaft to move axially opening the valve of the charging port. Means are provided for preventing rotational movement of the axially movable shaft.

11 Claims, 8 Drawing Sheets

REFRIGERATION SYSTEM SERVICE ADAPTER

The present invention relates to a service adapter intended to direct refrigerant from a refrigerant supply source to a refrigeration system through a charging port which is normally attached to the refrigeration system and in communication therewith. It may also be used to evacuate refrigerant from a refrigeration system.

U.S. Pat. No. 5,139,049 assigned to the assignee of the present invention and incorporated herein by reference discloses a service adapter having a sleeve valve and a manually operated valve seal which cooperate to maintain the adapter passage closed under all conditions when the adapter is not connected to the charging port of the refrigeration system. As is well recognized, current environmental concerns is such that venting of refrigerants to the atmosphere is not acceptable, thus the need to maintain the adapter passage closed when the adapter is not connected to the charging port. These concerns are reflected in the Surface Vehicle Recommended Practice SAE J639 (REV. November 1991) issued by the Society of Automotive Engineers, Inc.

The design of the service adapter of the present invention is such that it may be shorter than the service adapter disclosed in U.S. Pat. No. 5,139,049. As a result it can be used in areas which are too confined for services adapters of the type disclosed in U.S. Pat. No. 5,139,049. It is particularly suitable for use in automobile air-conditioning systems where space for installation of components is at a premium. As will be appreciated, a shorter service adapter requires less material than a longer one and, thus, is potentially less expensive.

Additionally, in contrast to the service adapter of U.S. Pat. No. 5,139,049 which utilizes a manual adjustment in which the shaft rotates while it is manually adjusted for axial movement, the design of the present service adapter permits the shaft to be adjusted axially within the adapter body without causing it to rotate. This is significant in that the valve and seal carried by such shaft is maintained in sealing engagement with the sleeve valve when the adapter is not connected to the charging port and any rotation of the shaft will cause the seal to rotate relative to the sleeve valve to which it is engaged causing premature wearing of the seal. Additionally, any rotation of the shaft will cause the end of the shaft which contacts the end of the poppet of the charging port to rotate relative to such poppet. Since some poppets have a rubber covering over the contacted end, any such rotation may damage such rubber covering.

It is an object of the present invention to provide a new and improved service adapter for connecting refrigerant from a refrigerant supply source to a refrigeration system, particularly in a very confined space, and to do so efficiently and without significant leakage of refrigerant to the atmosphere.

It is a further object of the present invention to provide a service adapter requiring less material than those required in the prior art and which may be manually adjusted without creating unnecessary wear on the seal.

It is an additional object of the present invention to provide a manually adjustable service adapter in which the valve seal may be manually adjusted for axial movement while being maintained in a fixed rotatable position.

It is yet another object of the present invention to provide a manually adjustable service adapter designed to minimize tolerance variations such that the actuation shaft will provide maximum engagement into the charge port to obtain maximum flow opening within the limitation of recommended standards of the Society of Automotive Engineers.

BEST MODE OF CARRYING OUT INVENTION

Figure 1:
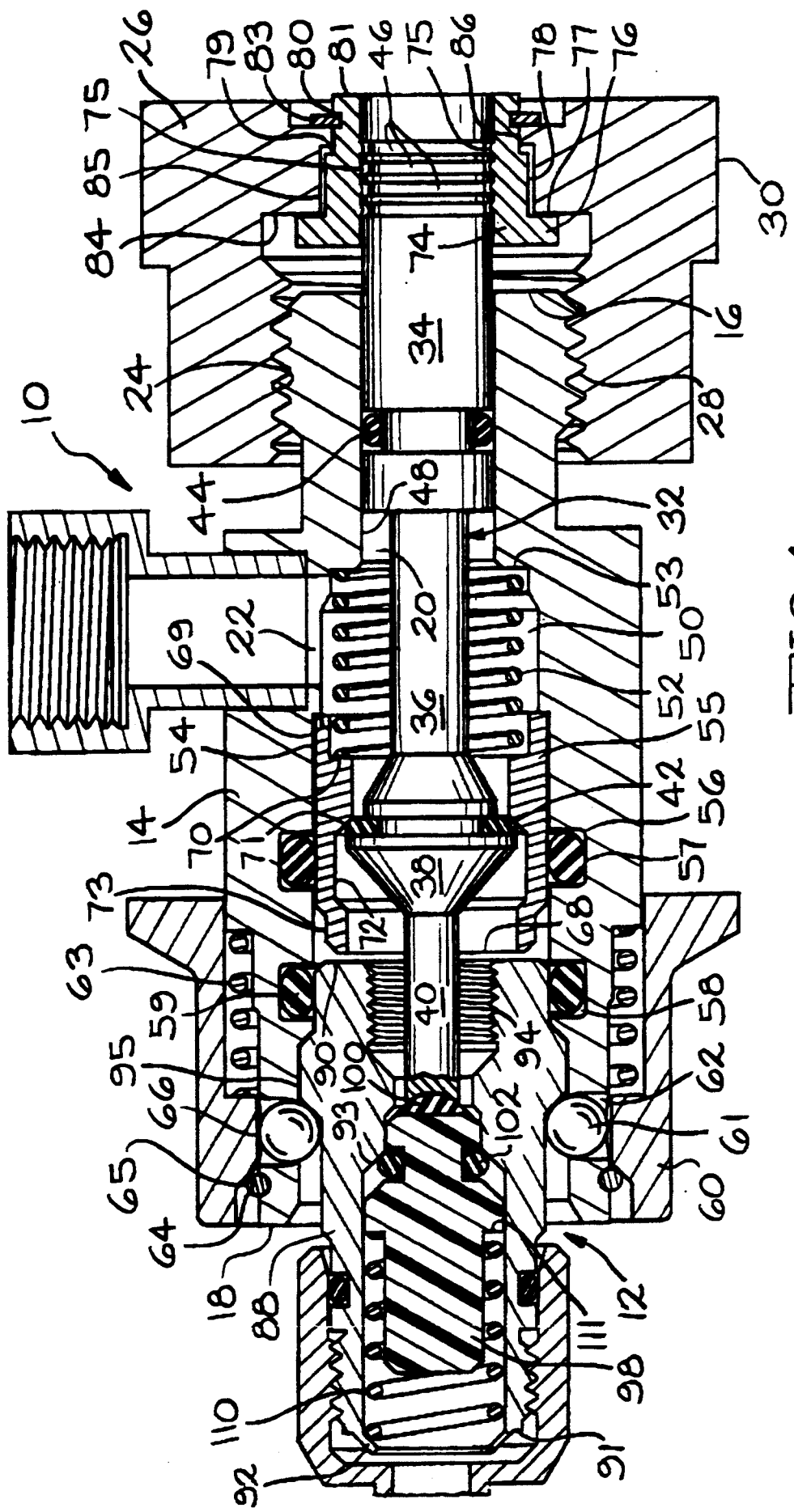
FIG. 1 is a sectional view of the service adapter of the present invention attached to a charging port of a refrigeration system with both the service adapter and the charging port in a closed or sealed position.

Referring now to FIGS. 1-6, there is provided a service adapter intended to be affixed to a charging port 12 which functions as an inlet for refrigerant being introduced to a refrigeration system to which the charging port 12 is connected.

The service adapter 10 includes a body portion 14 which extends from an adjustment end 16 to an outlet end 18. A central passage 20 extends from the adjustment end 16 to the outlet end 18 and communicates with a lateral port 22 formed in the body portion 14 between the adjustment end 16 and outlet end 18. Externally disposed threads 24 are formed on the body portion 14 adjacent the adjustment end 16. A rotatable knob 26 having internal threads 28 is engaged to the threads 24 and has an enlarged gripping portion 30 in an area of the knob 26 which extends axially beyond the adjustment end 16 of the body portion 14.

Positioned within the passage 20 is an actuation shaft 32. The actuation shaft 32 includes a first cylindrical section 34, a second cylindrical section 36 of reduced cross-sectional size, an enlarged valve head 38 and an axial extension 40 extending therefrom. The enlarged valve head 38 has a concentric groove defined thereon for receiving an elastomeric seal ring 42. The first cylindrical section 34 has an annular groove defined thereon for receiving an elastomeric seal ring 44. The first cylindrical section 34 extends beyond the adjustment end 16 of the body portion 14 and has four annular grooves 46 formed in that portion located outwardly of such adjustment end 16.

The passage 20 includes a first cylindrical section 48 sized to slidingly receive the first cylindrical section 34 of the actuation shaft 32 with the elastomeric ring seal 44 in sealing engagement therewith to prevent the flow of refrigerant entering through the lateral port 22 from escaping through the adjustment end 16. The passage 20 becomes enlarged in the area adjacent the lateral port 22 to form a spring chamber 50 in which is positioned a compression spring 52. A shoulder 53 is defined at the juncture between the first cylindrical section 48 and the spring chamber 50. One end of the compression spring 52 is retained against the shoulder 53.

The central passage 20 is further enlarged to provide an enlarged cylindrical chamber 54 within which is positioned a sleeve valve 55. The body portion 14 is provided with a first inwardly facing annular groove 56 within which is positioned an elastomeric seal ring 57 which is maintained in sealing engagement with the outer wall of the sleeve valve 55 while permitting sliding movement of such sleeve valve in relation to the elastomeric seal ring 57. The body portion 14 is provided with a second inwardly facing annular groove 58 in a position between the annular groove 56 and the outlet end 18. An elastomeric seal ring 59 is positioned in the second inwardly facing annular groove 58.

The service adapter 10 is connected to the charging port 12 by an annular locking sleeve 60 slidabelly and axially displaceable on the outlet end 18 of the body portion 14. The locking sleeve 60 is adapted to radially position a plurality of detent balls 61 located within radial holes 62 defined in the body portion 14. The holes 62, inwardly, are of a diameter slightly less than the diameter of the detent balls 61, thus preventing the balls 61 from falling radially inwardly from the holes 62. The locking sleeve 60 is biased toward the outlet end 18 by a compression spring 63. A stop clip 64 located within a recess in the body portion 14 engages a conical cam surface 65 to limit movement of the locking sleeve 60 to the left. A cylindrical detent ball retaining surface 66 is defined on the locking sleeve 60 which is radially aligned with the balls 61 and biases the balls inwardly when the service adapter 10 and charging port 12 are interconnected.

The sleeve valve 55 is axially displaceable within the enlarged cylindrical chamber 54. The sleeve valve 55 includes an outlet end 68 and an inlet end 69. An inwardly facing shoulder 70 is formed adjacent the inlet end 69 and provides a surface against which the left end of compression spring 52 is retained. The sleeve valve 55 is provided with a conical valve seat 71 adapted to seal with the elastomeric ring seal 42 of the enlarged valve head 38. The compression spring 52 biases the sleeve valve 55 toward the outlet end 18 of the body portion 14 to cause the conical valve seat 71 to normally be sealingly engaged with the elastomeric ring seal 42. The sleeve valve 55 has an internally enlarged area 72 adjacent the conical valve seat 71 which has a diameter greater than the diameter of the elastomeric ring seal 42 and all other portions of the enlarged valve head 38. Such enlarged area 72 provides a passage for the flow of refrigerant therethrough when the conical valve seat 71 becomes disengaged from the elastomeric ring seal 42.

Figure 4:
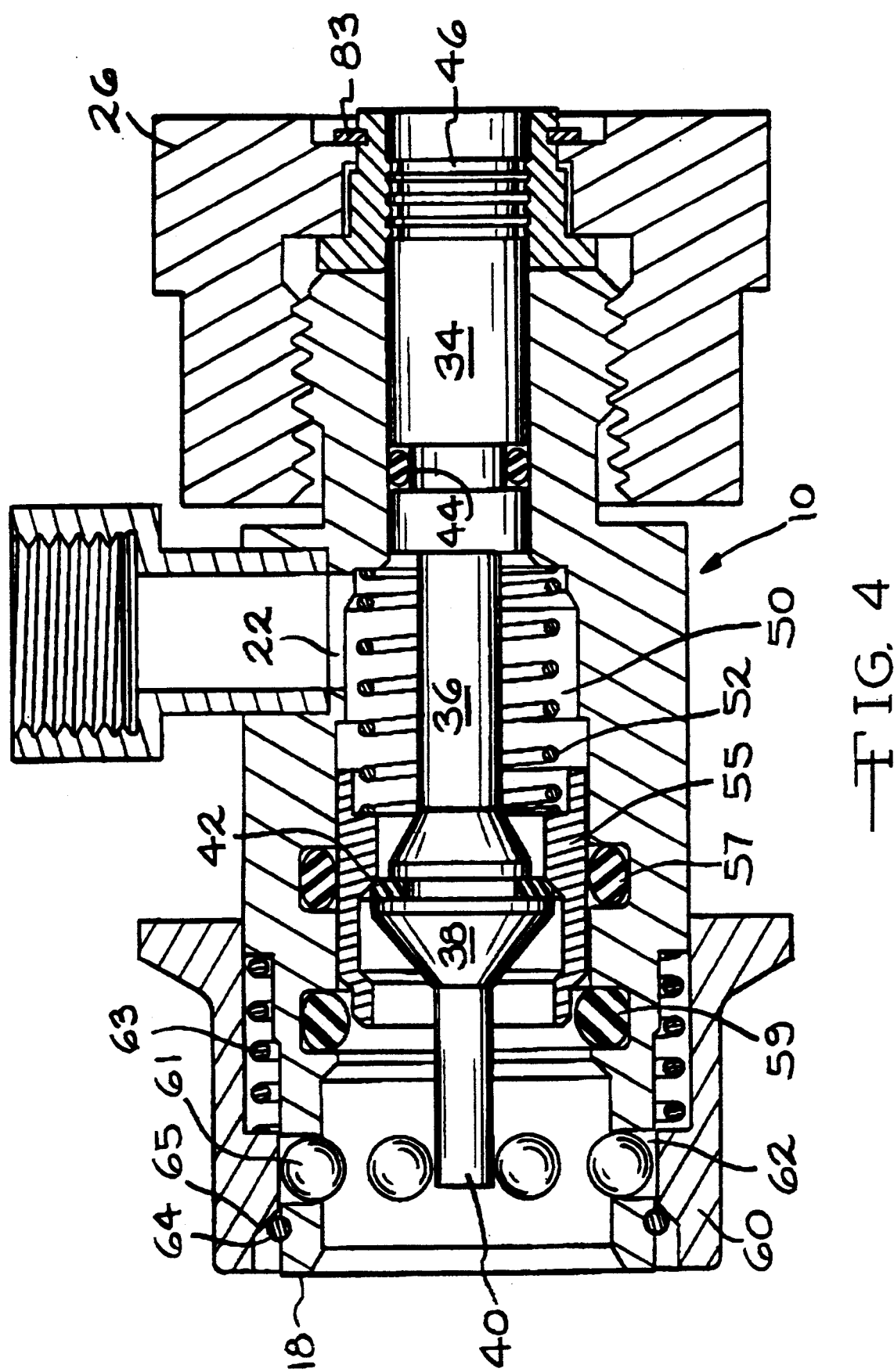
FIG. 4 is a view similar to FIG. 3 showing the shaft and valve sleeve following manual adjustment of the shaft to its maximum axial position toward the outlet end.
Figure 5:
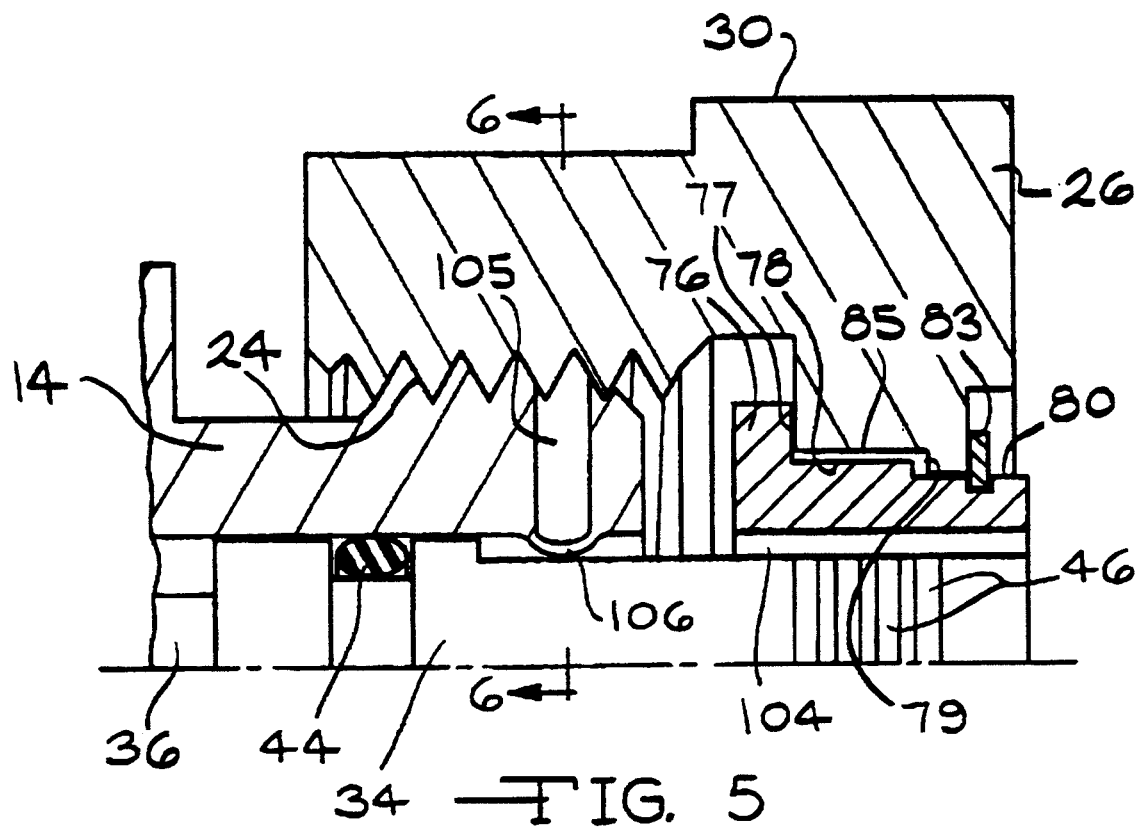
FIG. 5 is a fragmentary sectional view showing the anti-rotation feature for preventing rotation of the shaft during rotation of the rotatable knob attached thereto.
Figure 6:
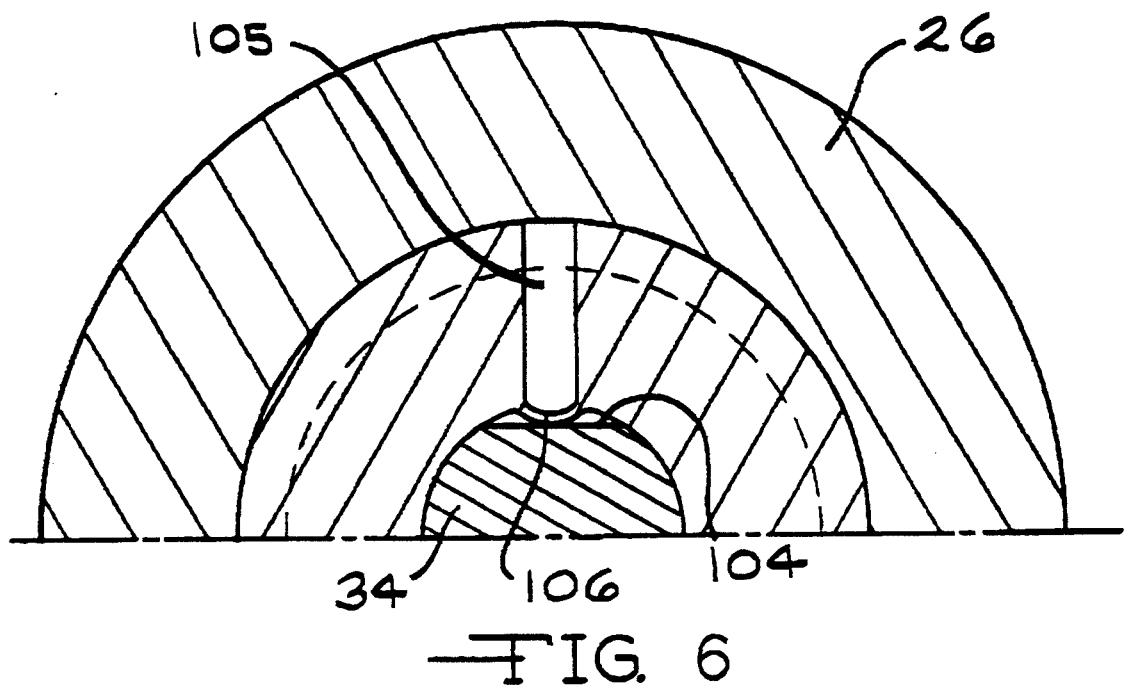
FIG. 6 is a sectional view taken through line 6—6 of FIG. 5.

The exterior surface of the sleeve valve 55 is provided with a step 73 of reduced diameter. The purpose of the step 73 is to reduce the likelihood of contact between the sleeve valve 55 and the elastomeric seal ring 59 positioned in the second annular groove 58 when the sleeve valve 55 is in its most extended position toward the outlet end 18 as shown in FIG. 4. Thus, contact between the sleeve valve 55 and both of the seal rings 57 and 59 could cause excessive drag on axial movement of the sleeve valve 55.

Axial movement of the actuation shaft 32 results from rotation of the knob 26 engaged to the external threads 24 of the body portion 14 and its interaction with the first cylindrical section 34 of the actuation shaft through a crimp sleeve 74 secured thereto.

As previously described, the first cylindrical section 34 has a plurality of four annular grooves 46 formed therein in an area of the first cylindrical section 34 which extends beyond the adjustment end 16 of the body portion 14. The sleeve 74 as manufactured has an internal diameter permitting the first cylindrical section 34 to be snugly received therein. Following positioning of the sleeve 74 over such first cylindrical section 34, the sleeve 74 is crimped or otherwise permanently deformed inwardly causing inner annular deformations 75 to be formed in the annular grooves 46 thus permanently affixing the crimp sleeve 74 to the first cylindrical section 34.

The crimp sleeve 74 has at its inner end an enlarged flange 76 defining a shoulder 77, a central cylindrical wall 78 having a diameter smaller than the flange 76 extending from the shoulder 77, a second shoulder 79 extending inwardly from said central cylindrical wall 78 and an outer cylindrical wall 80 extending from said second shoulder 79 to the outermost end 81. An outwardly facing annular groove is formed in the outer cylindrical wall 80 and receives therein a clip 83 for retaining the knob 26.

The knob 26 has an inner shoulder 84 sized to engage the shoulder 77 of the crimp ring 74, a cylindrical wall 85 extending therefrom which has a diameter slightly larger than the central cylindrical wall 78 of the crimp ring 74 and an inwardly directed flange 86 having an internal diameter smaller than the diameter of the central cylindrical wall 78. The knob 26 is rotatable relative to the crimp ring 74 and the axial movement of such knob 26 caused by its rotation will cause the outer shoulder of the flange 86 to engage the snap ring 83 thus moving the actuation shaft 32 to the right as viewed in FIG. 1 when the knob is rotated in the counter-clockwise direction and will cause the inner shoulder 84 to push against the shoulder of flange 76 to move the crimp ring 74 and the actuation shaft 32 to the left when the actuation knob 26 is rotated in the clockwise direction to the position shown in FIG. 2.

The charging port 12 includes a body 88 having a central passage 89 extending therethrough from an inlet end 90 to an outlet end 91 having a radially inwardly deformed annular lip 92. The central passage 89 includes a reduced diameter tapered valve seat 93 and internal threads 94 adjacent the inlet end for receiving a dust cap (not shown) which is removed prior to engagement of the service adapter 10 thereto. The body is provided with an annular enlarged shoulder 95 which cooperates with the detent balls 61 to retain the service adapter 10 in engagement with the charging port 12.

Figure 2:
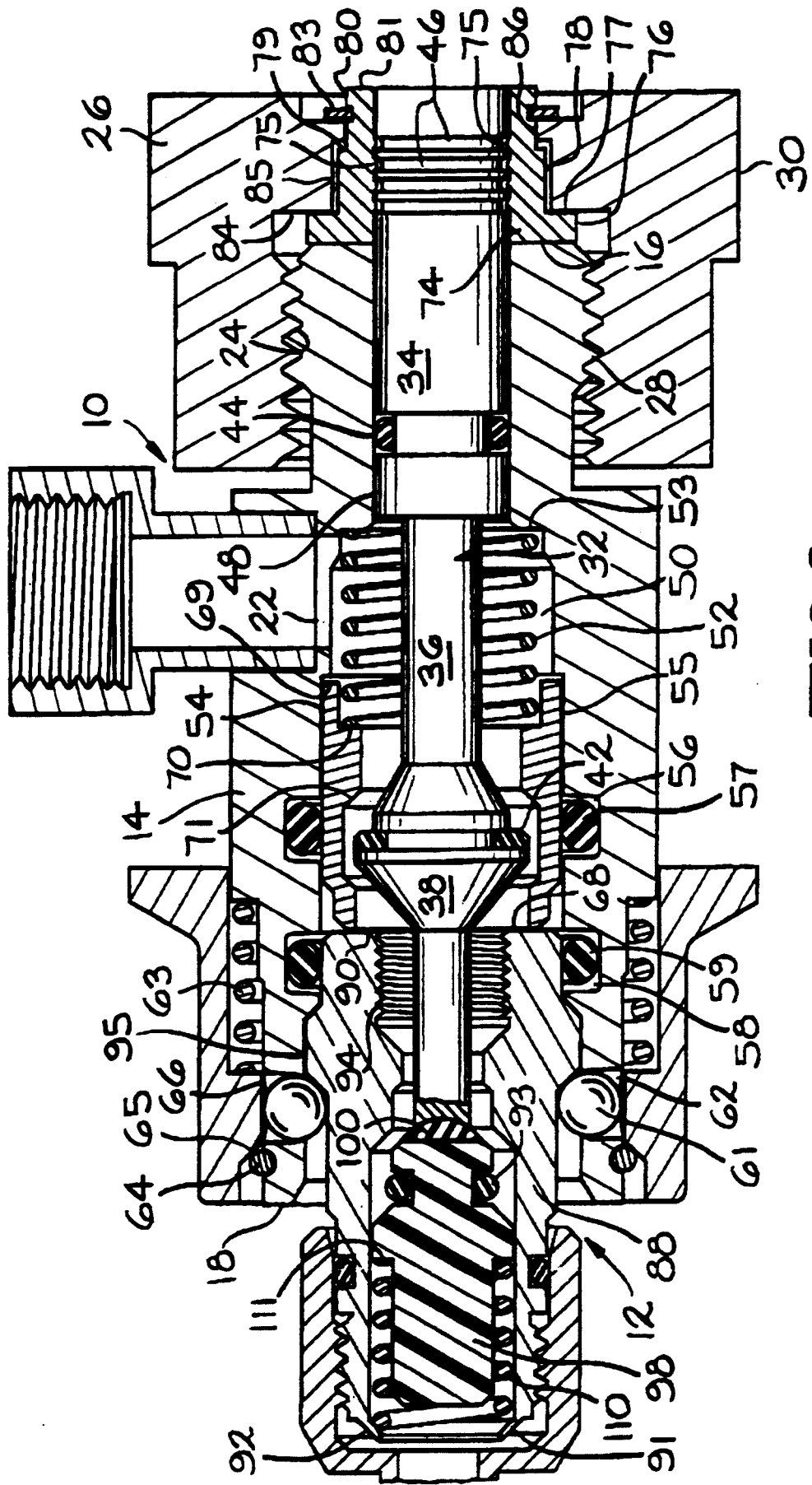
FIG. 2 is a view similar to FIG. 1 showing the relative position of the parts with both in an open position following manual adjustment to move the shaft and seal of the service adapter axially to the left as shown in FIG. 2.
Figure 3:
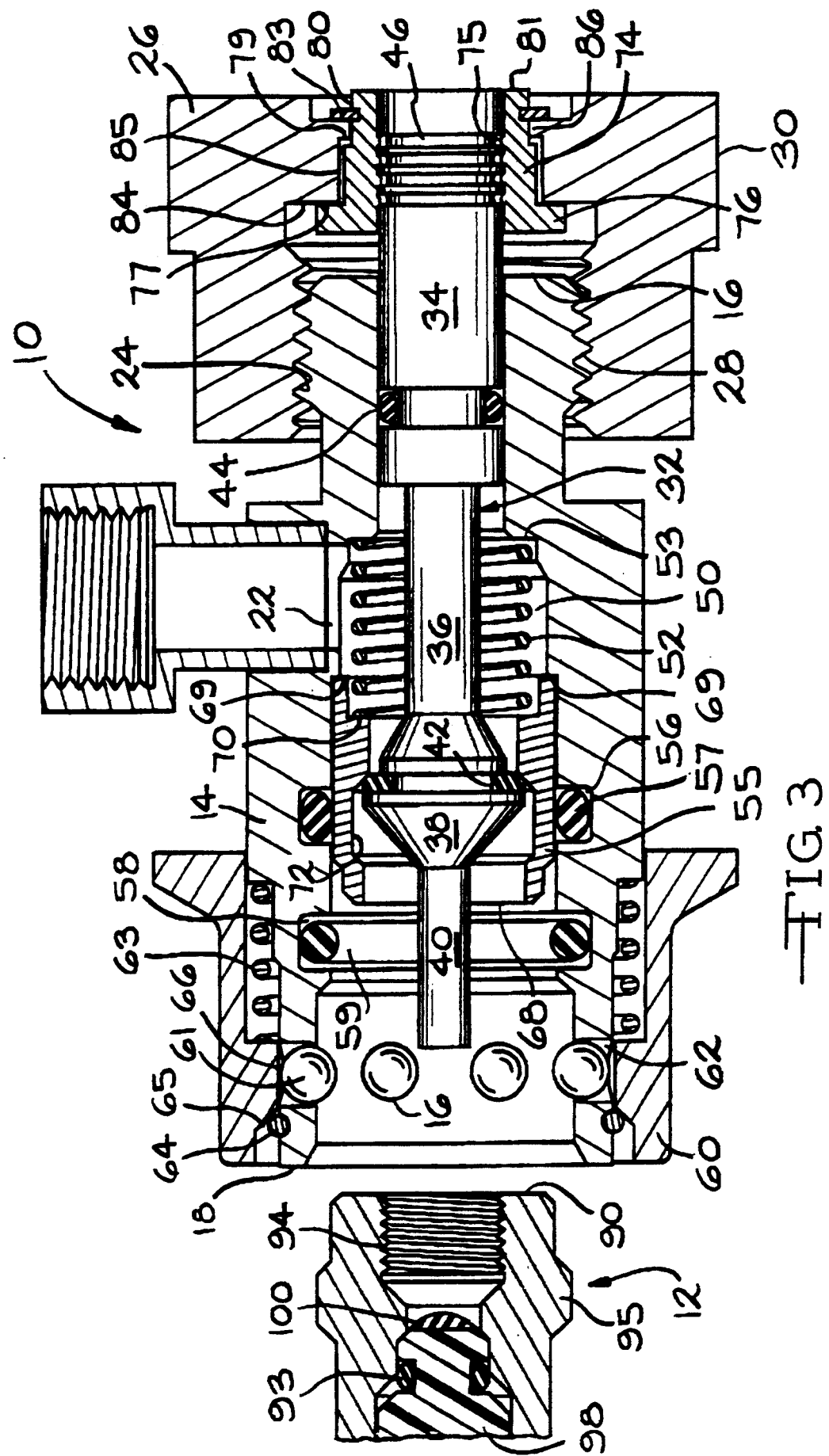
FIG. 3 is a view of the service adapter and a fragmentary view of the charging port in a disassembled position.

An axially displaceable poppet valve 98 is mounted within the passage 89 of the charging port body 88 has a groove formed therein for receiving an annular elastomeric seal 102. When the valve 98 is closed the seal 102 will sealingly engage the tapered valve seat 93. The poppet valve 98 may have a convexly-shaped button 100 of elastomeric material adhered thereto and centrally positioned to be contacted by the leading end of the axial extension 40 of the actuation shaft when the service adapter 10 is engaged to the charging port 12 and the knob 26 is rotated in the clockwise direction to open (1) the enlarged valve head 38 and its elastomeric seal ring 42 and the poppet valve 98 and its annular seal 102 as shown in FIG. 2 to permit the flow of refrigerant through both the service adapter and the charging port 12. The leading end of the axial extension 40 is typically formed with a slight concavity. Thus, any rotational movement between it and the convexly-shaped button 100 could serve to cut and prematurely wear such convexly-shaped elastomeric button 100. Additionally, rotational movement of the actuation shaft 32 may also cause premature wearing of the elastomeric ring seal 42. Thus, it is extremely desirable to provide the means disclosed herein for moving the actuation shaft 32 axially without causing it to move rotationally.

A compression spring 110 encircles the portion of the poppet valve 98 adjacent the outlet end 91 and is contained within the body 88 by the annular lip 92. The spring yieldingly urges the poppet valve to a closed position by engaging the shoulder 111.

As will be appreciated, friction caused by rotational movement of the inner shoulder 84 of the knob 26 against the flange 77 of the crimp sleeve 74 and of the flange 86 against the clip 83 will have a tendency to urge the actuation shaft 32 to rotational movement. However, any such rotational movement of the actuation shaft is prevented by forming on the portion of the first cylindrical section 34 adjacent the adjustment end 16 of the body portion 14 one or more flats 104. A dead end passage 105 is drilled partially but not completely through the body portion 14 radially inwardly from the external threads 24. Then, following insertion of the first cylindrical section 34 into the first cylindrical section 48 of the body portion 14, the portion of such body portion 14 at the end of the dead end passageway 105 is deformed radially inwardly to form a detent 106 which engages the flat 104. If desired, the detent 106 could be formed prior to insertion of the first cylindrical section. The engagement of the detent 106 with the flat 104 prevents rotation of the actuation shaft 32 and its first cylindrical section 34 while permitting axial movement of such shaft and its flat relative thereto. The use of the flat and detent concept provides means for preventing rotation of the actuation shaft 32 without the necessity and expense of providing separate parts.

An additional advantage of the service adapter of the present invention resides in its ability to be precisely positioned relative to the poppet valve 98 when the charging port 12 is engaged to the service adapter 10. This is significant as SAE Service Vehicle Recommended Practice Standard J639 referenced above specifies at paragraph 5.3.1.1 that the ". . . maximum coupling depression location shall not exceed 8.3 mm from the face of the fitting . . . " Thus, as shown in FIG. 2, when the service adapter 10 is engaged to the charging port 12 and the knob 26 is rotated to move the actuation shaft 32 to the left as shown in such figure to its fully opened position and the axial extension moves the poppet valve 98 to its open position, the maximum distance from the inlet end of the charging port 12 to the apex of the convexly-shaped button 100 should not exceed 8.3 mm. Also, in order to achieve maximum valve opening and maximum flow, the axial extension 40 should extend into the charge port 12 as close as possible to 8.3 mm.

This precise adjustment may be obtained by precisely positioning the first cylindrical section 34 of the actuation shaft relative to the crimp sleeve 74 prior to crimping it to engage the annular deformations 75 in the annular grooves 46.

As will be appreciated and was the case in the prior art service adapter of U.S. Pat. No. 5,139,049, refrigerant cannot flow from the service adapter unless the service adapter is fastened to the charging port 12. This is true no matter whether the actuation shaft is in the retracted position to the right as shown in FIG. 1 or in the extended position shown in FIG. 4 because of the axial movement of the sleeve valve 55 in response to the compression spring 52 with the result that the seal 42 will remain engaged to the conical valve seat 71. As may be seen by comparing FIGS. 1 and 2, following engagement of the service adapter 10 and the charging port 12 and the subsequent axial movement of the actuation shaft 32 causes the outlet end 68 of the sleeve valve 55 to abut the inlet end 90 of the charging port with the result that continued axial movement to the left of the actuation shaft moves the ring seal 42 out of engagement with the conical valve seat thus opening such valve to the flow of refrigerant. Similarly, such continued movement to the left causes the axial extension 40 of the actuation shaft to move the poppet valve 98 to the left against the urging of the compression spring 110 thus opening the poppet valve by removing the annular seal 102 from the tapered valve seat 93.

Figure 7:
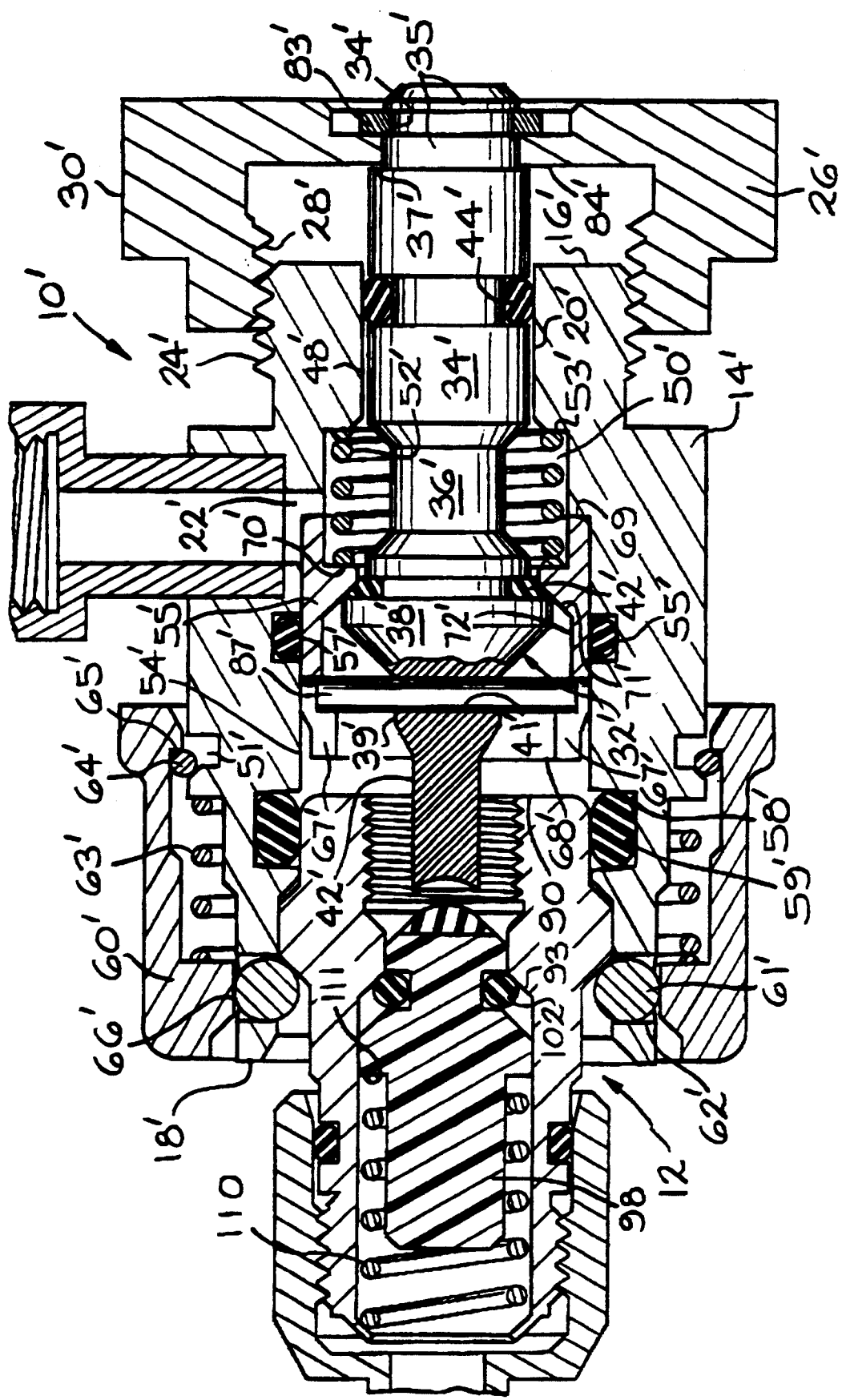
FIG. 7 is a view similar to FIG. 1 showing a modified embodiment of the present invention.
Figure 8:
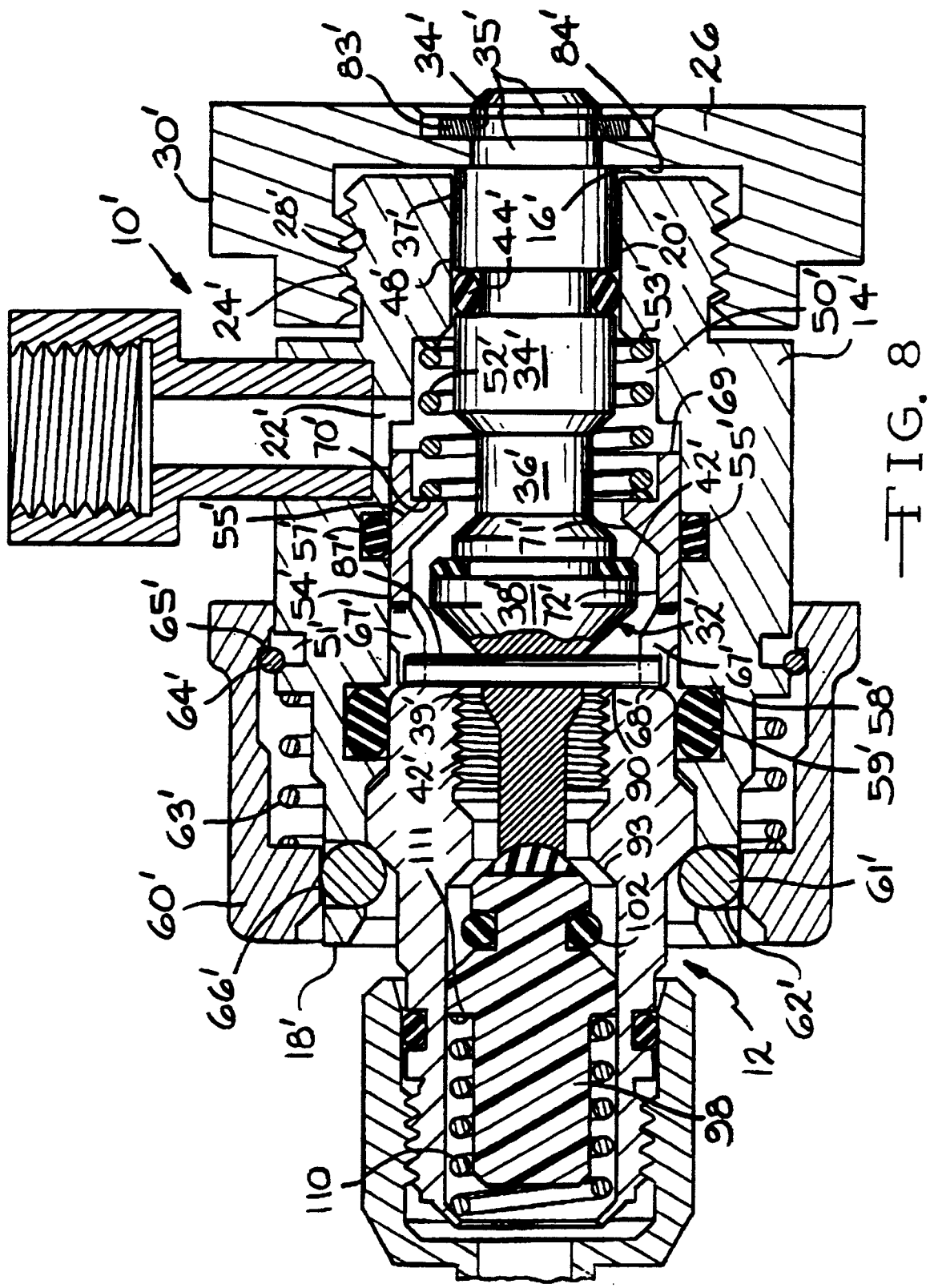
FIG. 8 is a view similar to FIG. 2 but showing the modified embodiment.
Figure 9:
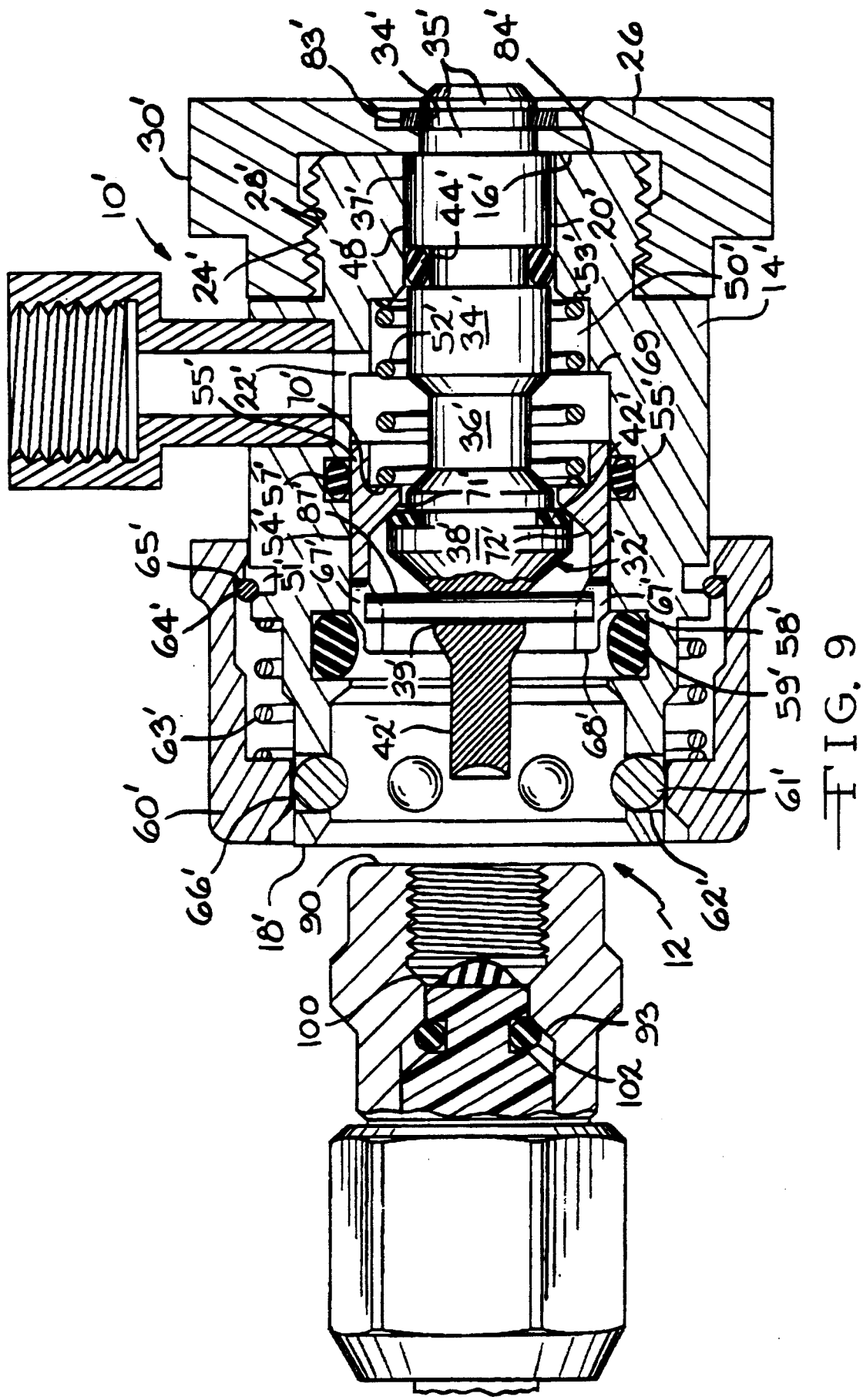
FIG. 9 is a view of the modified embodiment service adapter and of the charging port in a disassembled position and showing the shaft and valve sleeve following manual adjustment of the shaft to its maximum axial position toward the outlet end.

Referring now to FIGS. 7–9, there is shown another embodiment of service adapter 10' in which different means are utilized for preventing rotation of the actuation shaft while permitting its axial movement in response to rotation of a knob affixed to external threads on the adjustment end of the body portion. As shown in FIGS. 7–9, there is provided a body portion 14' extending from an adjustment end 16' to an outlet end 18'. A central passage 20' extends from the adjustment end 16' to the outlet end 18' and communicates with a lateral port 22' formed in the body portion 14' between the adjustment end 16' and outlet end 18'. Externally disposed threads 24' are formed on the body portion 14' adjacent the adjustment end 16'. A rotatable knob 26' having internal threads 28' is engaged to the threads 24' and has an enlarged gripping portion 30'.

Positioned within the passage 20' is an actuation shaft 32'. The actuation shaft 32' includes a first cylindrical section 34', a second cylindrical section 36' of reduced cross-sectional size, an enlarged valve head 38', a transition section 39' and an axial extension 40' extending therefrom. The transition section 39' includes a cylindrical portion having a diameter larger than the diameter of the axial extension 40' and a conical portion tapering to the axial extension. A lateral passageway 41' is formed in the cylindrical portion of transition section 39'. The enlarged valve head 38' has a concentric groove defined thereon for receiving an elastomeric seal ring 42'. The first cylindrical section 34' has an annular groove defined thereon for receiving an elastomeric seal ring 44'. The first cylindrical section 34' extends beyond the adjustment end 16' of the body portion 14'. Extending outwardly from the first cylindrical section 34' is a knob engaging extension 35' having a smaller diameter than that of the first cylindrical section 34' and cooperating therewith to define a shoulder 37'. An annular groove 39' is formed in the knob engaging extension 35'.

The passage 20' includes a first cylindrical section 48' sized to slidingly receive the first cylindrical section 34' of the actuation shaft 32' with the elastomeric ring seal 44' in sealing engagement therewith to prevent the flow of refrigerant entering through the lateral port 22' from escaping through the adjustment end 16'. As can be seen by comparing FIGS. 1 and 7, the length of the first cylindrical section 48' of the FIG. 7 embodiment is shorter than the length of the first cylindrical section of the FIG. 1 embodiment. This permits the overall length of the service adapter of the FIG. 7 embodiment to be shorter than the one of the FIG. 1 embodiment. This reduction in length is due primarily to elimination of the crimp sleeve which was used in the FIG. 1 embodiment. The passage 20' becomes enlarged in the area adjacent the lateral port 22' to form a spring chamber 50' in which is positioned a compression spring 52'. A shoulder 53' is defined at the juncture between the first cylindrical section 48' and the spring chamber 50'. One end of the compression spring 52' is retained against the shoulder 53'.

The central passage 20' is further enlarged to provide an enlarged cylindrical chamber 54' within which is positioned a sleeve valve 55'. The body portion 14' is provided with a first inwardly facing annular groove 56' within which is positioned an elastomeric seal ring 57' which is maintained in sealing engagement with the outer wall of the sleeve valve 55' while permitting sliding movement of such sleeve valve in relation to the elastomeric seal ring 57'. The body portion 14' is provided with a second inwardly facing annular groove 58' in a position between the end of the sleeve valve 55' and the outlet end 18' of the body portion 14'. An elastomeric seal ring 59' is positioned in the second inwardly facing annular groove 58'.

The service adapter 10' is connected to the charging port 12 by an annular locking sleeve 60' slidablely and axially displaceable on the outlet end 18' of the body portion 14'. The locking sleeve 60' is adapted to radially position a plurality of detent balls 61' located within radial holes 62' defined in the body portion 14'. The holes 62', inwardly, are of a diameter slightly less than the diameter of the detent balls 61', thus preventing the balls 61' from falling radially inwardly from the holes 62. The locking sleeve 60' is biased toward the outlet end 18' by a compression spring 63'. A stop clip 64' located within a recess 51' in the body portion 14' engages a shoulder 65' to limit movement of the locking sleeve 60' to the left. A cylindrical detent ball retaining surface 66' is defined on the locking sleeve 60' which is radially aligned with the balls 61' and biases the balls inwardly when the service adapter 10' and charging port 12' are interconnected. p The sleeve valve 55' is axially displaceable within the enlarged cylindrical chamber 54'. The sleeve valve 55' includes an outlet end 68' and an inlet end 69'. An inwardly facing shoulder 70' is formed adjacent the inlet end 69' and provides a surface against which the left end of compression spring 52' is retained. The sleeve valve 55' is provided with a conical valve seat 71' adapted to seal with the elastomeric ring seal 42' of the enlarged valve head 38'. The compression spring 52' biases the sleeve valve 55' toward the outlet end 18' of the body portion 14' to cause the conical valve seat 71' to normally be sealingly engaged with the elastomeric ring seal 42'. The sleeve valve 55' has an internally enlarged area 72' adjacent the conical valve seat 71' which has a diameter greater than the diameter of the elastomeric ring seal 42' and all other portions of the enlarged valve head 38'. Such enlarged area 72' provides a passage for the flow of refrigerant therethrough when the conical valve seat 71' becomes disengaged from the elastomeric ring seal 42'. The outlet end 68' of the sleeve valve 55' is provided with a pair of axially extending, diametrically opposed slots 67'. A pin 87' extends laterally through the lateral passageway 41' of the actuation shaft 32'. The opposing ends of the pin 87' are positioned in the slots 67' thus preventing rotational movement between the actuation shaft 32' and the sleeve valve 55' while permitting axial movement therebetween.

The exterior surface of the sleeve valve 55' is provided with a step 73' of reduced diameter. The purpose of the step 73' is to reduce the likelihood of contact between the sleeve valve 55' and the elastomeric sealing ring 59' positioned in the second annular groove 58' when the sleeve valve 55' is in its most extended position toward the outlet end 18' as may be seen in FIG. 9.

Axial movement of the actuation shaft 32' results from rotation of the knob 26' engaged to the external threads 24' of the body portion 14' and its interaction with the first cylindrical section 34' of the actuation shaft 32.

The knob 26' has an inwardly extending flange 84' having an internal diameter slightly larger than the diameter of the knob engaging extension 35' but smaller than the diameter of the first cylindrical section 34'. Thus, the flange is rotatable relative to the actuation shaft 32' and its knob engaging extension 35'. Upon rotation of the knob in the clockwise direction, the flange 84' will engage the shoulder 37' and cause the actuation shaft 32' to be moved axially within the passage 20'. Although friction caused by rotational movement of the flange 84' against the shoulder 37' will have a tendency to urge the actuation shaft rotationally, rotation of such actuation shaft 32' relative to the sleeve valve 55' is prevented by the pin 87' extending through the lateral passageway 41' and engaging the slots 67' of the sleeve valve. Friction between the sleeve valve 55' and the seal ring 57' plus friction between the sleeve valve 55' and the spring 52' is sufficient to prevent rotational movement of the sleeve valve.

The knob 26' is retained on the actuation shaft 32' by means of a clip 83' positioned in the groove 39' of the knob engaging extension 35'. The clip 83' is split to permit its expansion during assembly and, following assembly, engages the left side of the flange 84' and the shoulder defined by the groove 39' and the right end of the knob engaging extension 35'.

The charging port 12 is similar to the charging port described in the previous embodiment and requires no further description.

As in the previous embodiment, the knob 26' should be rotated to its most counter-clockwise position so that the actuation shaft 32' is in its retracted position when the service adapter 10' and the charging port 12 are initially engaged to one another. The enlarged valve head 38' will be in a closed position with the elastomeric ring seal 42' engaged against the conical valve seat 71' thus preventing refrigerant entering through the port 22' from exiting. Additionally, the charging port 12 is in a sealed position with the annular seal 102 engaging the tapered valve seat 93. Following such engagement, the knob 26 is rotated in a clockwise direction with engagement between the threads 24' and 28' causing it to move the actuation shaft 32' axially to the left. As can be seen from FIG. 7, since the outlet end 68' of the sleeve valve 55' is spaced from the inlet end 90 of the charging port 12, initial movement of the actuation shaft 32' does not release the ring seal 42' from its engagement with the conical valve seat 71'. However, when the outlet end 68' of such sleeve valve 55' reaches the inlet end 90 of the charging port 12, further movement of the actuation shaft 32' axially to the left will displace such actuation shaft 32' and the ring seal 42' relative to the sleeve valve 55' and its conical valve seat 71' thus opening such seal and permitting the flow of refrigerant therethrough. Similarly, the axial movement of such actuation shaft 32' causes the axial extension 40' to engage and axially displace the poppet valve 98 of the charging port and thereby disengaging the annular seal 102 from the tapered valve seat 93 and permitting the flow of refrigerant into the refrigeration system. The pin 87' is precisely positioned such that when it engages the inlet end 90 of the charge port 12, it will open the poppet valve 98 to substantially its maximum opening without extending beyond the 8.3 mm set forth in SAE Standard J639.

As previously mentioned, the overall length of the service adapter 10 of this embodiment is even shorter than the overall length of the embodiment of FIGS. 1-6, thus permitting its use in extremely confined spaces. Furthermore, such shorter length also results in less material and potentially less costly service valve as in the prior art.

Other modifications will be readily apparent to those skilled in the art. Accordingly, the scope of the present invention should be limited only by the scope of the appended claims.

I claim:

1. A service adapter for connecting refrigerant from a supply source to a refrigeration system having an inlet coupling comprising:
   (a) a body portion having a central passageway extending along an axis from an adjustment end having external threads to an outlet end and a lateral port positioned between said ends providing communication to said passageway for refrigerant from said supply source;
   (b) an axial movable shaft in said passageway extending from a first end positioned between said lateral port and said outlet end to a second end in the area of said adjustment end, said first end including a seal engageable and disengageable with abutment means in said passageway in response to axial movement of said shaft;
   (c) an internally threaded knob rotatably engaged to said external threads and connected to said shaft to move said shaft axially upon rotation of said knob to engage and disengage said seal to and from said abutment; and
   (d) a pin engaged to and extending laterally from said shaft, said pin (i) having an end portion engaged in a slot positioned in said body, said slot permitting axial movement of said pin therein while preventing rotational movement and (ii) positioned to engage said inlet coupling upon connecting of said service adapter thereto to limit the extent to which said shaft may enter said coupling.

2. A service adapter according to claim 1, wherein an annular sleeve valve is positioned in said central passageway between said outlet end and said lateral port, said sleeve valve encircling said shaft and having an inlet end, an outlet end and an internal wall, said sleeve valve being axially movable within said passageway, said slot extending axially on said valve sleeve internal wall.

3. A service adapter according to claim 1, wherein an annular sleeve valve is positioned in said central passageway between said outlet end and said lateral port, said sleeve valve encircling said shaft and having an inlet end, an outlet end and an internal wall, said sleeve valve being axially movable within said passageway, at least two axially extending slots on said valve sleeve internal wall, said pin having end portions engaged in said slots for axial movement therein.

4. A service adapter for connecting refrigerant from a supply source to a refrigeration system having an inlet coupling comprising:
   (a) a body portion having a central passageway extending along an axis from an adjustment end to an outlet end and a lateral port positioned between said ends providing communication to said passageway for refrigerant from said supply source;
   (b) an axially movable shaft in said passageway extending from a first sealing end positioned between said lateral port and said outlet end to a second end in the area of said adjustment end, said sealing end including a seal engageable and disengageable with abutment means in said passageway in response to axial movement of said shaft, and
   (c) means for moving said shaft axially to engage and disengage said seal to and from said abutment while preventing rotation of said shaft relative to said body portion, wherein said means for moving said shaft includes external threads on said body portion at said adjustment end, an internally threaded knob rotatably engaged to said external threads, and means for connecting said knob to said shaft to move said shaft axially upon rotation of said knob and means for preventing rotation of said shaft in response to rotation of said knob, said means for preventing rotation of said shaft comprising an axially extending planar portion on said shaft and a detent on said body portion extending inwardly from said body portion central passageway into engagement with said planar portion, said planar portion being axially movable relative to said detent.

5. Apparatus for controlling the flow of fluid comprising in combination:
   (a) a coupling having a housing extending along an axis from an inlet end to an outlet end, an axial passage for receiving fluid at said inlet end and discharging fluid at said outlet end, a valve in said passage axially displaceable from a closed position toward said inlet end to an open position further away from said inlet end and means yieldingly urging said valve to said closed position; and
   (b) a service adapter engaged with said coupling, said service adapter including,
      (i) a body portion extending along an axis from a first end receiving said coupling to a second end, said body having external threads adjacent said second end;
      (ii) an axial passageway in said body portion extending from said first end to said second end;
      (iii) a lateral port in said body communicating with said passageway;
      (iv) a sleeve valve positioned in said passageway between said first end and said lateral port and axially movable in said passageway and means for yieldingly urging said sleeve valve toward said first end, said sleeve valve having at least one inwardly facing slot extending in an axial direction;

(v) an actuation member in said passageway, said actuation member extending through said sleeve valve and being axially movable relative to both said body portion and said sleeve valve, means for sealingly engaging and disengaging said actuation member to said sleeve valve in response to said relative axial movement therebetween, said actuation member having a pin engaged to and extending laterally therefrom, said pin (i) having an end portion engaged in said slot, said slot permitting axial movement of said pin therein while preventing rotational movement of said actuation member and (ii) positioned to engage said coupling inlet end to limit the extent to which said actuation member may enter said coupling;

(vi) a knob having internal threads threadedly engaged to said body portion external threads and rotatably engaged to said actuation member, rotation of said knob causing axial movement of said actuation member between a retracted position and an extended position, said movement to an extended position (1) causing engagement with and movement of said coupling valve axially to an open position and (2) permitting movement of said sleeve valve into engagement with said coupling inlet end in response to said means for yieldingly urging and (3) causing movement of said actuation member relative to said sleeve valve to disengage said sealing means and open said service adapter for the flow of fluid.

6. The combination according to claim 5 further including means causing resistance to rotation of said sleeve valve.

7. Apparatus for controlling the flow of fluid comprising in combination:

(a) a coupling having a housing extending along an axis from an inlet end to an outlet end, an axial passage for receiving fluid at said inlet end and discharging fluid at said outlet end, a valve in said passage axially displaceable from a closed position toward said inlet end to an open position further away from said inlet end and means yieldingly said valve to said closed position; and (b) a service adapter engaged with said coupling, said service adapter including, (i) a body portion extending along an axis from a first end receiving said coupling to a second end, said body having external threads adjacent said second end;

(ii) an axial passageway in said body portion extending from said first end to said second end;

(iii) a lateral port in said body communicating with said passageway;

(iv) a sleeve valve positioned in said passageway between said first end and said lateral port and axially movable in said passageway and means for yieldingly urging said sleeve valve toward said first end;

(v) an actuation member in said passageway, said actuation member extending through said sleeve valve and being axially movable relative to both said body portion and said sleeve valve, means for sealingly engaging and disengaging said actuation member to said sleeve valve in response to said relative axial movement therebetween;

(vi) a knob having internal threads threadedly engaged to said body portion external threads and rotatably engaged to said actuation member, rotation of said knob causing axial movement of said actuation member between a retracted and extended position, said movement to an extended position (1) causing engagement with and movement of said coupling valve axially to an open position and (2) permitting movement of said sleeve valve into engagement with said coupling inlet end in response to said means for yieldingly urging and (3) causing movement of said actuation member relative to said sleeve valve to disengage said sealing means and open said service adapter for the flow of fluid; and (vii) means for preventing rotation of said actuation member, said means for preventing rotation comprising an axially extending planar portion in an area of said actuation member in slideable engagement with said body portion and a detent on said body portion extending inwardly into said passageway toward said planar portion, said planar portion being axially movable relative to said detent.

8. In a service adapter for adding refrigerant to a refrigeration system comprising a service adapter body, an axial flow passage defined in said body, a conduit fitting defined on said service adapter body in communication with said passage, releasable locking means to selectively lock said body in an aligned interconnected relationship with a compatible charging port, a manually actuated axially displaceable valve within said service adapter body, means for axially displacing said valve between first and second axial positions, interlock means located within said service adapter body passage maintaining said manually actuated valve in a closed condition regardless of the axial position of said manually actuated valve, said interlock means engaging a charging port when said service adapter body is fully connected thereto and such engagement deactivating said interlock means whereby said manually actuated valve controls fluid flow through said service adapter body passage, said interlock means within said service adapter body comprising an annular sleeve valve axially displaceable within said service adapter body passage, spring means within said service adapter body passage biasing said sleeve valve into a closed relationship with said manually actuated valve, said sleeve valve adapted to engage a charging port upon said service adapter body being fully interconnected thereto, said engagement axially retaining said sleeve valve against displacement by said spring means, the improvement wherein said axially displaceable valve has a lateral pin extending therefrom in a position to engage and limit its positioning to an interconnected charging port and wherein said means for axially displacing said valve comprises:

(a) external threads on said service adapter body;

(b) a knob having internal threads threadedly engaged to said body portion external threads and rotatably engaged to said axially displaceable valve, rotation of said knob causing axial movement of said axially displaceable valve between a retracted and an extended position, and (c) means for preventing rotation of said axially displaceable valve.

9. A service adapter according to claim 8, wherein said means for preventing rotation includes axially extending slot means on said annular sleeve valve and said lateral pin has an end engaged in said slot means for axial movement therein.

10. In a service adapter for adding refrigerant to a refrigeration system comprising a service adapter body, an axial flow passage defined in said body, a conduit fitting defined on said service adapter body in communication with said passage, releasable locking means to selectively lock said body in an aligned interconnected relationship with a compatible charging port, a manually actuated axially displaceable valve within said service adapter body, means for axially displacing said valve between first and second axial positions, interlock means located within said service adapter body passage maintaining said manually actuated valve in a closed condition regardless of the axial position of said manually actuated valve, said interlock means engaging a charging port when said service adapter body is fully connected thereto and such engagement deactivating said interlock means whereby said manually actuated valve controls fluid flow through said service adapter body passage, said interlock means within said service adapter body comprising an annular sleeve valve axially displaceable within said service adapter body passage, spring means within said service adapter body passage biasing said sleeve valve into a closed relationship with said manually actuated valve, said sleeve valve adapted to engage a charging port upon said service adapter body being fully interconnected thereto, said engagement axially retaining said sleeve valve against displacement by said spring means, the improvement wherein said means for axially displacing said valve comprises:
 (a) external threads on said service adapter body;
 (b) a knob having internal threads threadedly engaged to said body portion external threads and rotatably engaged to said axially displaceable valve, rotation of said knob causing axial movement of said axially displaceable valve between a retracted and an extended portion, and
 (c) means for preventing rotation of said axially displaceable valve comprising an axially extending planar portion in an area of said axially displaceable valve in slidable engagement with said body and a detent on said body extending inwardly into engagement with said planar portion, said planar portion being axially movable relative to said detent.

11. In a service adapter for adding refrigerant to a refrigeration system comprising a service adapter body, an axial flow passage defined in said body, a conduit fitting defined on said service adapter body in communication with said passage, releasable locking means to selectively lock said body in an aligned interconnected relationship with a compatible charging port, a manually actually axially displaceable valve within said service adapter body, means for axially displacing said valve between first and second axial positions, interlock means located within said service adapter body passage maintaining said manually actuated valve in a closed condition regardless of the axial position of said manually actuated valve, said interlock means engaging a charging port when said service adapter body is fully connected thereto and such engagement deactivating said interlock means whereby said manually actuated valve controls fluid flow through said service adapter body passage, said interlock means within said service adapter body comprising an annular sleeve valve axially displaceable within said service adapter body passage, spring means within said service adapter body passage biasing said sleeve valve into a closed relationship with said manually actuated valve, said sleeve valve adapted to engage a charging port upon said service adapter body being fully interconnected thereto, said engagement axially retaining said sleeve valve against displacement by said spring means, the improvement comprising axially extending slot means on said annular sleeve valve and a lateral pin extending from said axially displaceable valve and engaged in said slot means for axial movement therein, said lateral pin (a) preventing rotation of said axially displaceable valve and (b) engageable with said interconnected charging port to limit its positioning relative thereto.

* * * * *